United States Patent [19]
Boerstal et al.

[11] Patent Number: 5,715,100
[45] Date of Patent: Feb. 3, 1998

[54] OPTICAL ADJUSTMENT ARRANGEMENT AND METHOD FOR A SCANNING SYSTEM

[75] Inventors: Hendricus G. J. Boerstal, Helden; Erik C. N. Puik, Maarheeze, both of Netherlands

[73] Assignee: OCE-Nederland, B.V., Ma Venlo, Netherlands

[21] Appl. No.: 654,548

[22] Filed: May 29, 1996

[30] Foreign Application Priority Data

May 30, 1995 [EP] European Pat. Off. ............ 95201413

[51] Int. Cl.$^6$ ........................................... G02B 7/02
[52] U.S. Cl. .................. 359/822; 358/406; 358/496; 358/497
[58] Field of Search ...................... 359/822, 811, 359/819; 358/406, 482, 494, 496, 497

[56] References Cited

U.S. PATENT DOCUMENTS

| | | | |
|---|---|---|---|
| 4,464,681 | 8/1984 | Jacobs et al. | 358/406 |
| 4,571,637 | 2/1986 | Thoone | 358/497 |
| 4,967,233 | 10/1990 | Buchar et al. | 358/496 |
| 5,008,873 | 4/1991 | Tanaka et al. | 359/822 |
| 5,138,496 | 8/1992 | Pong | 359/822 |
| 5,267,089 | 11/1993 | Yamamoto et al. | 359/822 |
| 5,490,128 | 2/1996 | Ogata | 359/822 |
| 5,508,851 | 4/1996 | Tachizawa | 359/822 |

FOREIGN PATENT DOCUMENTS

| | | |
|---|---|---|
| 0235201 | 10/1991 | European Pat. Off. . |
| 87 009988 | 2/1987 | WIPO . |

*Primary Examiner*—Loha Ben
*Attorney, Agent, or Firm*—Birch, Stewart, Kolasch & Birch, LLP

[57] ABSTRACT

An optical adjustment arrangement for a scanning system comprises a main part having defined thereon a triangle with a center point and first and second base points. An optical part is positioned onto the main part so that the center point is aligned with the optical axis of the optical part. The right and left sides of the optical part are adjusted separately and independently by first and second adjustment devices. The position of the adjustment devices coincides with the base points of the triangle. When one of the first and second adjustment devices is moved in a direction perpendicular to the plane defining the triangle, the main part with the optical part is rotated around the line connecting the other of the first and second base points with the center point. Stabilizing parts acting as flexible hinges are preferably provided around the main part.

28 Claims, 5 Drawing Sheets

OPTICAL ADJUSTMENT ARRANGEMENT AND METHOD FOR A SCANNING SYSTEM

FIELD OF THE INVENTION

The invention relates to an optical adjustment arrangement and method for a scanning system. The arrangement comprises an optical part to be adjusted, a mounting onto which the optical part is mounted and a frame onto which the mounting is fixed. Preferably the optical part is an array of light detecting elements or an imaging device. The invention also relates to a multiple optical adjustment arrangement comprising at least first and second optical adjustment arrangements of the above-mentioned kind.

DESCRIPTION OF THE INVENTION

Scanning systems for scanning a document are well known in the art. In such systems a document to be scanned is detected, line-by-line, by a camera having photodetecting elements and an imaging device such as a lens. The photodetecting elements have to be adjusted both with respect to the focus and with respect to the position of the scan line. Depending upon the maximum width of documents to be scanned and the space available for the optical path, either a single photodetecting array or a plurality of adjacently positioned arrays may be utilized.

In particular when scanning large documents, i.e. up to 1000 mm width, the prior art approaches have been to provide a plurality of photodetecting arrays aligned with each other. This is because the space available for the optical path is often very restricted which would require a very large array for scanning at a reasonable resolution. Such large arrays are not normally available on the market or are extremely expensive. Multiple array arrangements are known, for example, from the documents EP-B-0 235 201 and U.S. Pat. No. 4,571,637. However, in such systems the problem occurs that the different arrays have to be aligned with each other very precisely in order to provide a high quality image. Also, there is a problem of overlapping regions or space between the arrays. Thus, as a result the adjustment arrangements for such systems become very complex.

In the above-cited European document, a complex structure with four adjustment means causing a plastic deformation is utilized to align each array with the others. Further, for adjustment of focus, a special measurement stand (FIG. 7 of the European document) is needed. On the other hand, another construction is known from the above-cited U.S. document, wherein for each array, five separate and independently operating adjustment means are needed for each camera. Moreover, it has been found that a further problem occurs in that the array is not flat but actually has a skew which also has to be compensated for.

SUMMARY OF THE INVENTION

It is an object of the present invention to provide an optical adjustment arrangement which is simple to handle and to manufacture and which may be easily recalibrated if necessary. The adjustment arrangement is equally well suited for the adjustment of the detecting array and the imaging device. It is capable of compensating for the problem of skew and to allow a very accurate calibration with respect to both focus and position of the scan line.

This object is solved by providing a mounting comprising a main part onto which the optical part is mounted, having a center point and first and second base points defining a triangle. The center point is fixed with respect to the frame and is on a line which is parallel with the optical axis of the optical part. Adjustment means are provided for separately adjusting the first and second base points in a direction transverse to the plane containing the triangle. Upon adjustment of one of the base points, the main part rotates around a line defined by the center point and the other of the two base points.

Preferably a multiple arrangement is provided comprising at least first and second such optical adjustment arrangements.

A further object of the invention is to provide a method of adjusting an optical arrangement for a scanning system. The method comprises the steps of providing at least one optical part and of mounting the at least one optical part on at least one of a first main part and a second main part. Each of the main parts has a center point and first and second base points defining a triangle. In the method, the center points of one of the first and second main parts are fixed on a frame with the center points of the first and second main parts being on a line which is parallel with an optical axis of the at least one optical part. The step of initially adjusting a position of the first base point of a selected main part in a direction transverse to a plane containing the triangle of the selected main part is carried out. The selected main part is either the first or second main part. Thereafter, the step of subsequently adjusting a position of the second base point of the selected main part in a direction transverse to a plane containing the triangle of the selected main part is carried out. The initial and subsequently adjusting steps are independently carried out and the step of initially adjusting rotates the selected main part around a line defined by the center point and one of the first and second base points. The step of subsequently adjusting rotates the selected main part about a line defined by the center point and the other of the first and second base points.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
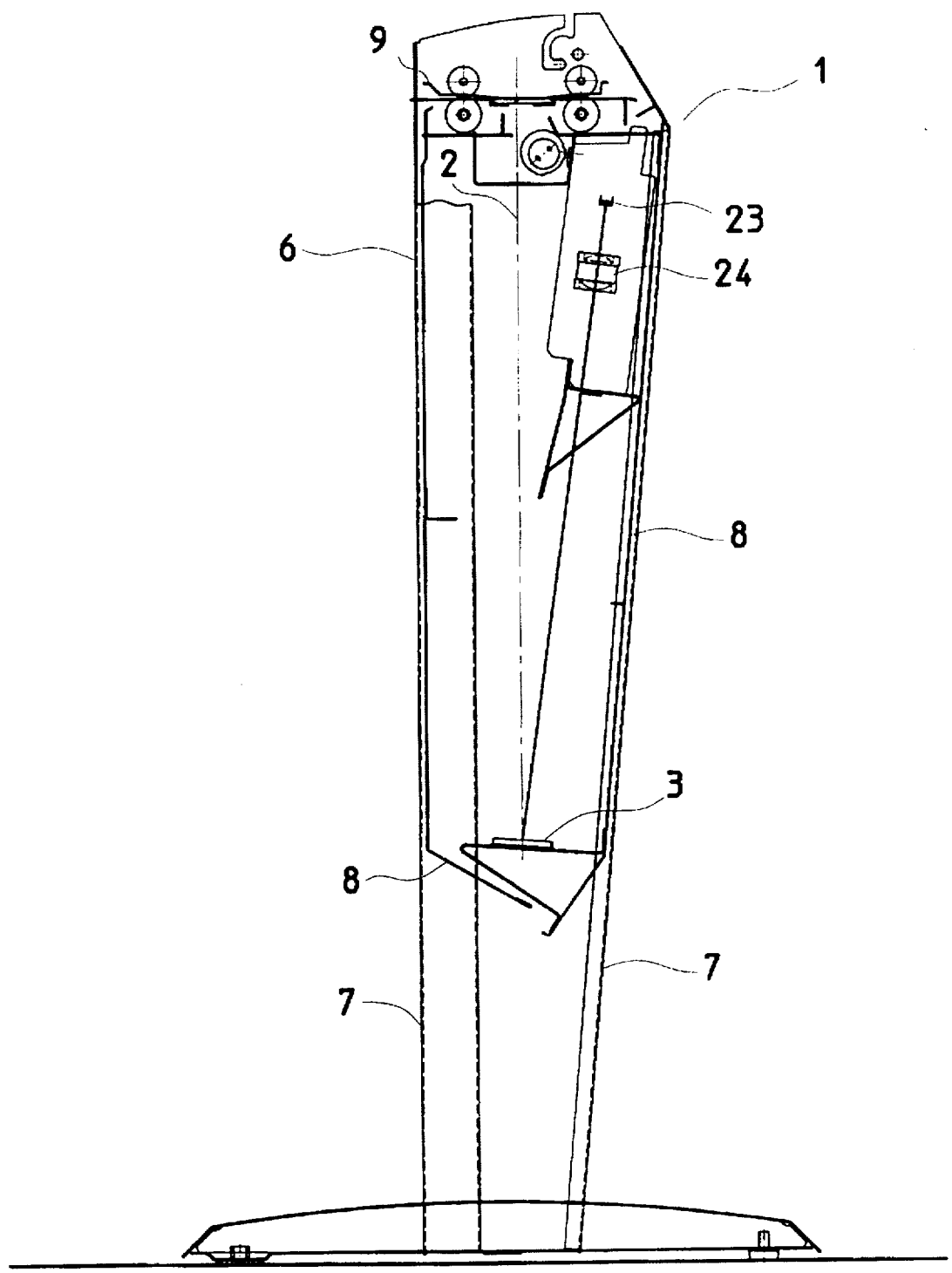
FIG. 1 shows a scanning apparatus in which the optical arrangement according to the present invention may be used.

In FIG. 1, a scanner 1 for large documents of up to 1000 mm width is shown. Such scanners are utilized, for example, in the engineering field when large drawings are to be scanned. In operation a document to be scanned is moved over a transparent plate defining a scan line in a sub-scan direction perpendicular to the direction of movement. In the engineering field when handling large documents such as drawings, these documents are often stored as folded documents. Before scanning the document is then unfolded. This results in wrinkles on the document. Thus, when such a document is scanned the scanned image may be of unsatisfactory quality if the document is not pressed flat onto the transparent plate.

The scanner 1 is therefore equipped with a pressing plate 9 for pressing the document against the plate. Since in a large width scanner the transparent plate also has to be of large width, a further problem occurs in that the plate is not quite flat over the whole width. Therefore, the pressing plate has to be of flexible material so as to be able to press the document tightly against the transparent plate over the whole width.

Figure 1A:
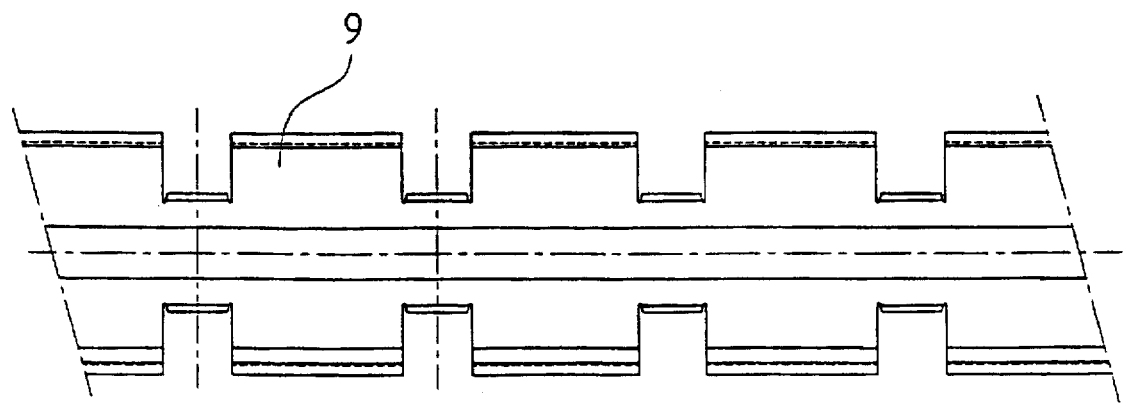
FIG. 1a shows a plate for pressing the document to be scanned against a transparent plate.

Referring now to FIG. 1a, an example of such a pressing plate 9 is shown. The plate 9 is preferably made of aluminum with a white coating thereon. The white coating serves the purpose of acting as a calibration surface which is scanned each time the scanner is switched on. It has been found that such a white coating adheres better to aluminum than to the plastic materials utilized in the prior art. This is of importance to assure a high quality surface for calibration purposes over a long time. As seen in the figure, the pressing plate 9 has a plurality of cut out portions formed in the plate. These cut out portions have a double function of both providing space for the feed rollers and assuring the necessary flexibility of the plate.

Referring back to FIG. 1, when a document is scanned each scan line is imaged onto a single photodetecting array 23. To be able to image such large documents onto a single photodetecting array, the optical path 2 has been made very long. This is achieved by utilizing the length of the stand 6 of the scanner for the optical path 2. A folding mirror 3 is positioned in the stand 6 near the bottom to further increase the length available for the optical path. Imaging means 24 such as a lens focuses the image of the scan line onto the photodetecting array 23. By providing such a long optical path 2 it is possible to image a scan line of a very large width onto a single CCD array and, thus, the problems of the prior art systems having a plurality of arrays which have to be carefully aligned are overcome. The photodetecting array 23 is preferably a CCD array with about 7500 detecting elements wherein each detecting element has a dimension of about 7×7 um. The optical path 2 thus requires a length of about 1000 mm in order to provide for the necessary magnification ratio. The stand 6 of the scanner is constructed as self-bearing without any frames. The stand has two side plates 7 and, mounted thereto, back and front plates 8. The optical parts, i.e. the mirror 3, the lens 24 and the array 23 are all mounted onto the back plate as shown in the figure.

In order to provide a high quality image of the document, the optical elements, i.e. the lens and the photodetecting array have to be carefully manually adjusted. A problem with such an array of photodetecting elements is that the array itself is not perfectly planar but has a skew. This skew is in the range of up to 60 um which is too much to assure a scanned image of high quality. Therefore, first the array 23 itself has to be adjusted so as to provide a sharp image over the whole length of the array 23. Then the imaging means, i.e. the lens 24, has to be adjusted so as to assure that the image focussed onto the array 23 is exactly aligned with the scan line.

Figure 2:
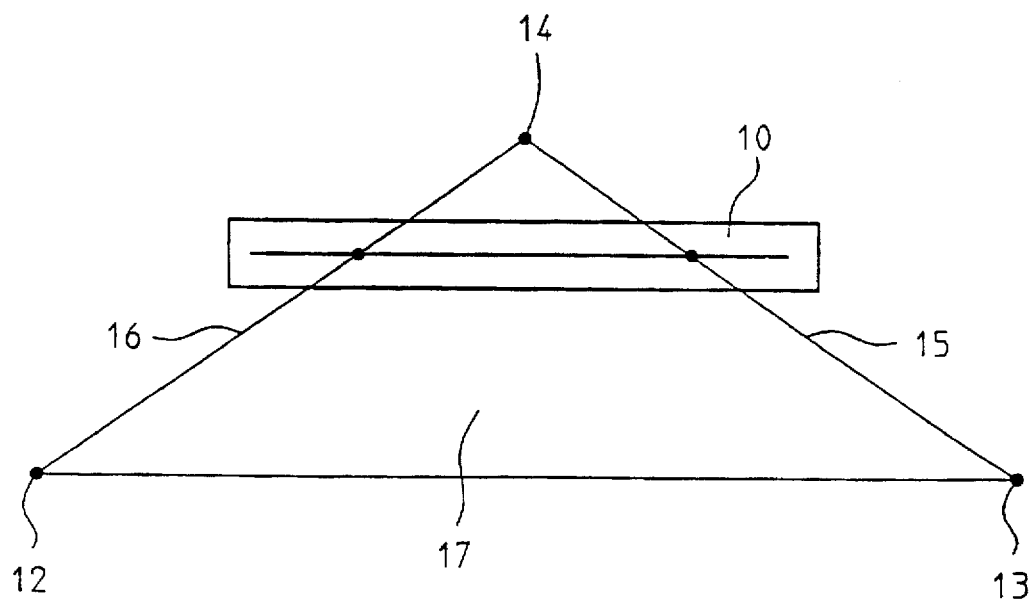
FIG. 2 is a schematic drawing for explaining the basic principles of the adjustment arrangement.

With reference to FIG. 2 the basic principles of an optical adjustment arrangement in accordance with the present invention will now be described. An important criteria when constructing such an adjustment arrangement is that the adjustments of the right and left side have to be totally independent of each other, i.e. the adjustment of one side is not allowed to influence a previous adjustment of the other side. Further, the adjustment should be easy to perform with a minimum of adjustment means being necessary. The basic principle of the present invention is to use a triangle construction.

In FIG. 2, an optical part 10 is shown as being positioned within a triangle 17. The optical part 10 is fixed onto a mounting. The optical part is to be adjusted in a direction transverse to the plane defining the triangle. It should be noted that the mounting part itself does not have to be in the form of a triangle as long as there are provided points defining the triangle. The triangle is defined by a center point 14 and first and second base points 12 and 13. The center point 14 is fixed with respect to a frame (not shown). The base points 12, 13 are separately and independently adjustable in a direction transverse to the plane defining the triangle.

Upon adjustment of the first base point 12, the mounting is rotated around a line 15 defined as the line between the center point 14 and the second base point 13. During this first adjustment, the second base point 13 acts as a fixed point. When the mounting is rotated around line 15, the optical part 10 is also moved in the same way. Thus, by adjusting the base point 12 back and forth, it is possible to find the optimum position of the left side of the optical part 10. In practice, this may be done by observing the intensity of light passing through or impinging upon the left side of the optical part 10. In the same way the right side of the optical part is adjusted by adjusting the second base point 13. The main part is then rotated around the line 16 between the first base point 12 and the center point 14. During this second adjustment, the first base point 12 acts as a fixed point and thus the first adjustment already made is not influenced by the second adjustment. In this way the right and left sides of the optical part can be separately and independently adjusted.

Figure 3:
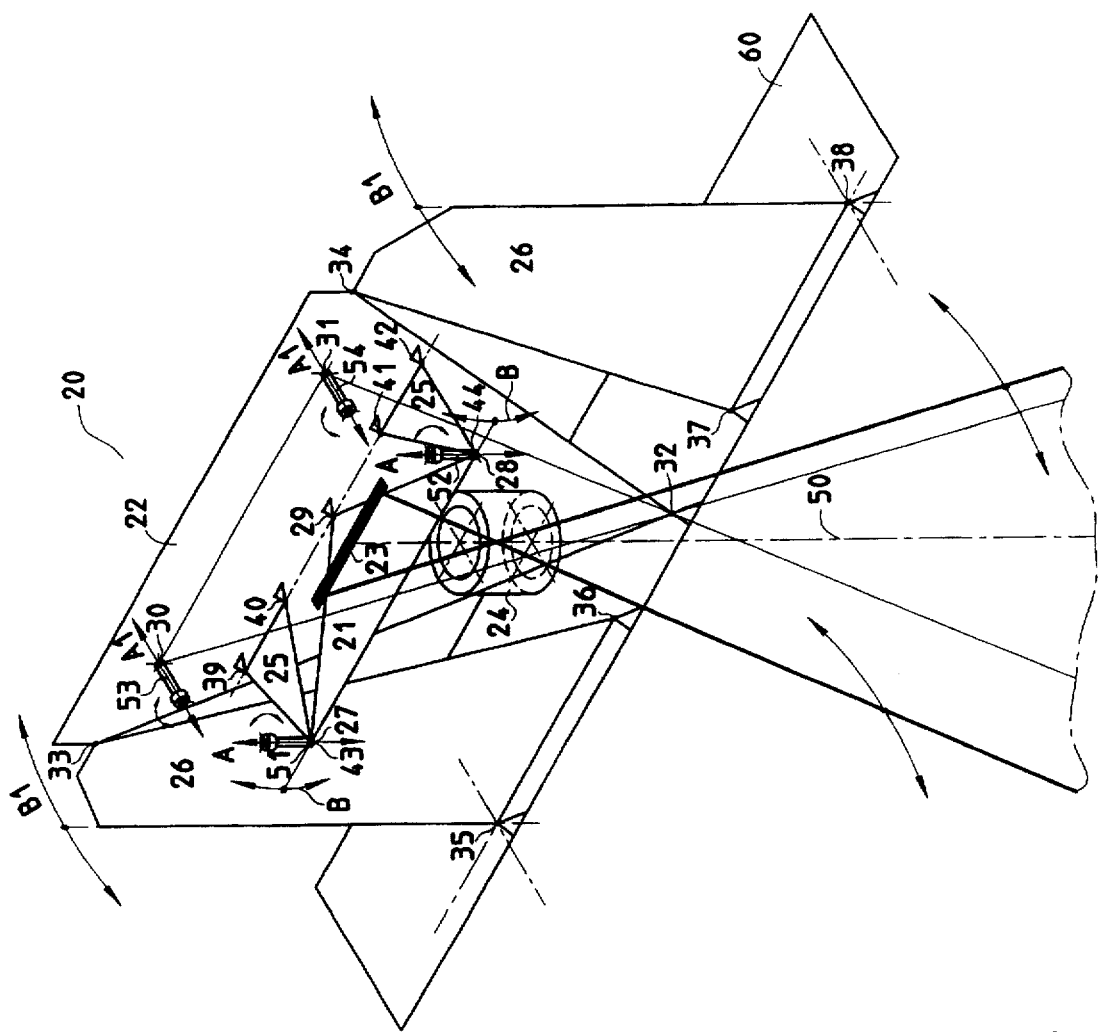
FIG. 3 shows a preferred multiple arrangement.

A preferred embodiment of the present invention will now be described with reference to FIG. 3. In this figure, a multiple arrangement comprising two optical adjustment arrangements for adjusting both the detecting array and the lens of the scanning apparatus of FIG. 1 is shown. Of course, it is not necessary to utilize the arrangement of the present invention in such a multiple arrangement but each part could be used also in a single arrangement. In FIG. 3, a multiple arrangement 20 is comprised of a first arrangement for adjusting a photodetecting array 23 so that a sharp image is formed over the whole width of the array, and a second arrangement for adjusting the position of the scan line with respect to the array.

The scan line is positioned by adjusting a lens 24 mounted onto the second arrangement together with the first arrangement onto which the array is mounted. Thus, the first and second arrangements are coupled to each other. The array 23 is mounted onto a first main part 21. The first main part 21 has a center point 29 which is on a line which is parallel with the optical axis 50 of the multiple optical arrangement as will be explained below. Further, first and second base points 27, 28 are provided. The center point 29 and the base points 27, 28 define a triangle. The base points 27, 28 are separately and independently adjustable by first and second adjustment means 51, 52 in a direction transverse to the plane defining the triangle, as shown in the figure by arrows A. The array of photodetecting elements 23 is mounted onto the first main part 21 so that a specific element on the left and right side respectively lies on the respective line from one of the base points 27, 28 to the center point 29. The specific elements are selected depending upon the number of elements needed for the image and the amount of skew of the array.

Figure 3A:
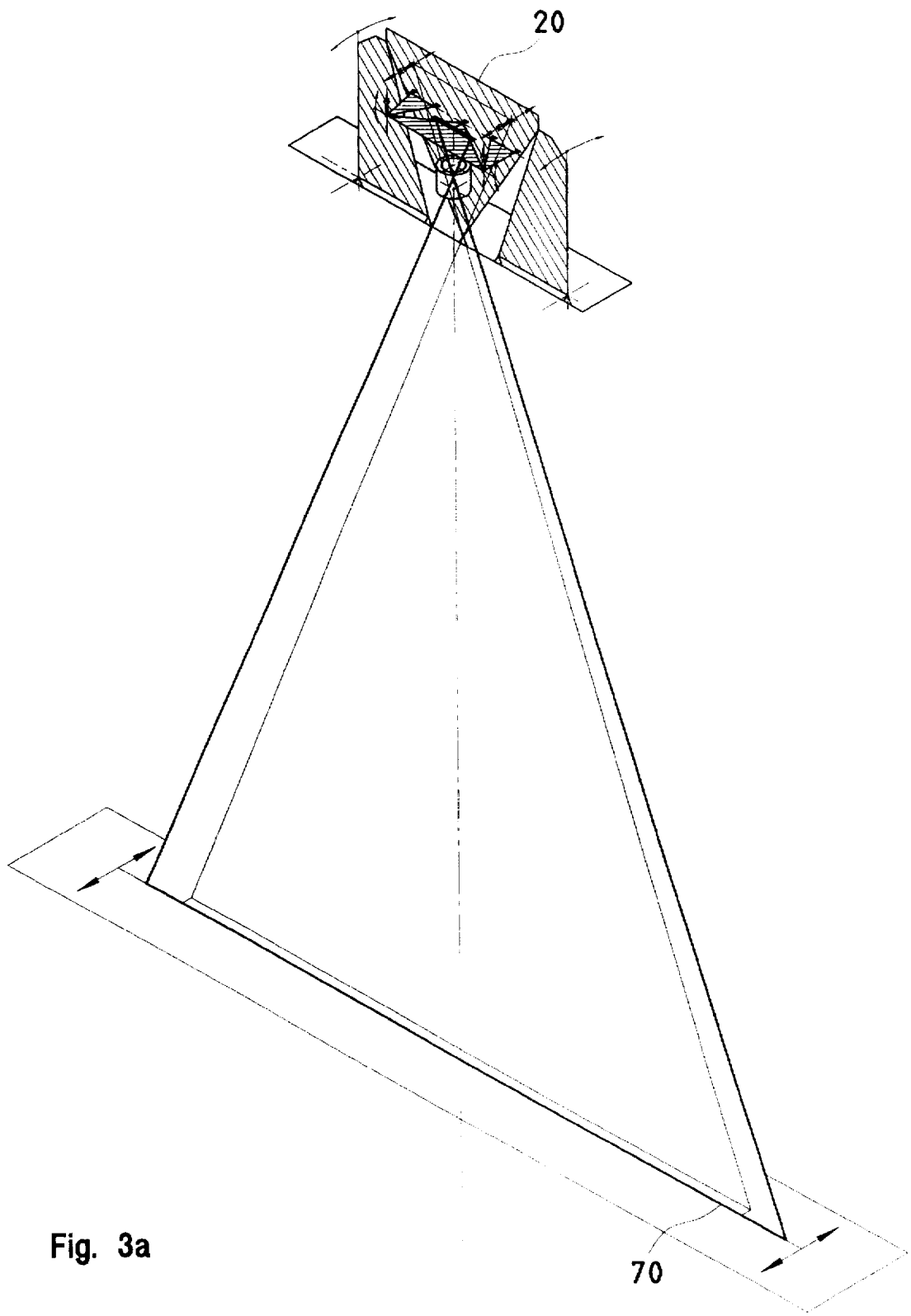
FIG. 3a schematically shows the relationship between the arrangement and the scan line.

In FIG. 3a the multiple arrangement 20 is shown in relation to the scan line indicated by numeral 70. The width of the scan line to be imaged is determined by the number of detecting elements on the sensor. The specific elements may be the respective outermost element of the array or may be selected to a specific number from the outermost element. In the example of FIG. 3, the array comprises 7500 elements of which 7200 are used for the scan line image. In order to achieve a maximum accuracy over the whole width of the array, the specific elements are chosen so that 600 elements lie outside the triangle on each side, i.e. 6300 elements lie inside the triangle. This is because otherwise, due to the skew of the array, the inaccuracy for the elements in the middle of the array would be too high.

On the left and right side of the main part 21, a respective stabilizing part 25 is provided. The stabilizing part 25 assures that the base points 27, 28 of the main part 21 are both adjustable and acting as fixed points during adjustment of the other side. To perform this double function the stabilizing parts are formed as flexible hinges with respect to the base points. Each stabilizing part 25 comprises a center point 43, 44 and first and second base points 39/40, 41/42. The center point and the base points define a triangle which is opposed to the main part triangle. The base points 39/40, 41/42 are fixed onto the main part 22 of the second arrangement and the center points 43, 44 are connected to the base points 27, 28 of the first main part 21. In the case of a single arrangement the base points of the stabilizing parts would be fixed to a frame onto which the main part is also fixed. In the embodiment of FIG. 3, the base points 39/40, 41/42 of the stabilizing parts lie on a common line with the center point 29 of the first main part 21. As can be seen in FIG. 3, preferably two stabilizing parts are positioned around the main part 21, one on each side. The stabilizing parts are only flexible in the direction indicated by arrows B and are stiff in all other directions.

Next, the second arrangement for adjusting the scan line position will be described. This arrangement is mainly identical to the first arrangement. A lens 24 is mounted onto the second main part 22. The second main part 22 comprises a center point 32 and first and second base points 30, 31 defining a triangle. The center point 32 is on a line intersecting center point 29, which line is parallel with the optical axis 50 of the multiple optical arrangement 20. The center point 32 is fixed with respect to the frame 60. The first and second base points 30, 31 are separately and independently adjustable by first and second adjustment means 53, 54 in a direction transverse to the plane defining the triangle, as shown in the figure by arrows A1. This direction is also transverse to the direction of adjustment of the first main part 21. In the second arrangement the main part 22 does not coincide with the triangle. This clearly shows that the form of the main part is not restricted to a triangle as long as there are provided base and center points defining a triangle in the above stated manner.

The positions of the base points 30, 31 are given from the fact that a line from the respective base point 30, 31 through the center point 32 will define the outer limits of the image to be imaged by the lens onto the 6300 elements lying within the triangle. With reference to FIG. 3a this means that the lines drawn from base points 30 and 31 respectively through the center point 32 will—when continued through the optical system—coincide with the outer limits of the part of the scan line 70 imaged onto these 6300 elements.

To the left and to the right of the second main part 22 there are provided stabilizing parts 26. The stabilizing parts 26 are constructed in the same way as the stabilizing parts 25 in the first arrangement, i.e. to function as flexible hinges with respect to the base points 30, 31 of the second main part 22. The stabilizing parts 26 each have first and second base points 35/36, 37/38 and a respective center point 33, 34. The base points are fixed with respect to the frame 60 and lie on a common line with the center point 32 of the second main part 22. The center points 33, 34 of the stabilizing parts are connected to respective base points 30, 31 of the main part. As can be seen in FIG. 3, in the second arrangement the center points 33, 34 of the stabilizing parts 26 are not directly connected to the base points 31 and 32 of the main part 22 as in the first arrangement. This is due to the fact that the triangle of the main part 22 does not coincide with the form of the main part 22. However, this is not a problem as long as the base points 30, 31 are connected to the center points 33, 34 of the stabilizing parts 26.

The second main part further acts as a frame with respect to the first main part 21. In other words, the center point 29 and the base points 39–42 of the stabilizing parts 25 are fixed to the second main part 22. The base points 35 to 38 and the center point 32 of the second arrangement are fixed onto a frame 60 which is schematically indicated in FIG. 3. The frame 60 may be fixed in the stand of the scanner shown in FIG. 1. Also in the second arrangement, the stabilizing parts 26 are only flexible in the direction indicated by arrows B1 and stiff in all other directions.

Next, the adjustment procedure will be described in more detail. When the arrangement of FIG. 3 is utilized in a scanner of the kind shown in FIG. 1, the following adjustment procedure will be executed. The position of the imaging means with respect to the array is pre-adjusted to provide an optimum focus in the middle of the array 23 by moving the lens 24 back and forth and detecting the signal of a predetermined number of detecting elements in the middle of the array 23. Next, the skew of the detecting array 23 will be compensated for by adjusting the left and right sides of the array separately in order to achieve a sharp image over the whole of the array. To assist in this procedure, a calibration sheet is positioned onto the transparent platen. Such a calibration sheet preferably comprises a line pattern which enables detection of maximum contrast. The sheet is positioned so that the image of the line pattern will be imaged onto a predetermined number, eg 100, of detecting elements of the array on each side. First the left side of the array is adjusted by movement of the adjustment means 51 and the signals from the left side elements are read out.

In one example, the adjustment means comprises a screw of the M3 size. This means that one turn of the screw corresponds to a movement of 0.5 mm in the adjustment direction. An adjustment of 50 um would thus correspond to 36 degrees so that high accuracy can be easily achieved. When the adjustment screw is turned, a signal indicating the contrast of the detected intensities is read out and the screw is adjusted until a predetermined value has been reached. Thereafter, the right side of the detecting array is adjusted in the same way by movement of the adjustment means 52.

Figure 4:
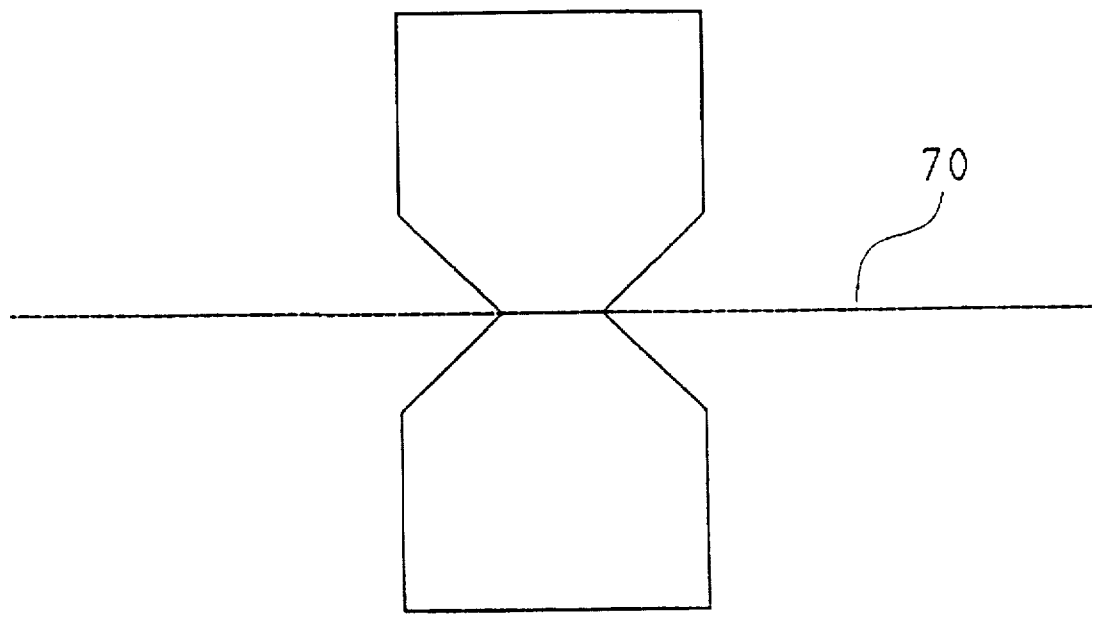
FIG. 4 shows a calibration sheet used for scan line adjustment.

When the detecting array has been thus optimally adjusted, it has to be aligned with the position of the scan line. This is because the mechanical tolerances are too high to assure an optimal alignment without manual adjustment. Upon adjustment of the scan line position another calibration sheet is placed on the transparent plate in a specific position. The calibration sheet is preferably in the form shown in FIG. 4. Such a sheet has a black surface to provide a high contrast. The sheet is positioned so that the smallest width is exactly in the middle of the scan line 70 as indicated in the figure. By detecting the intensity of light impinging upon a predetermined number of photodetecting elements, the left and right side of the scan line position can be optimally adjusted by turning the adjustment screws 53 and 54, respectively. When the position of the scan line is adjusted a signal corresponding to the number of elements being covered by the black sheet is read out. If the number of elements is too high then the position of the scan line is adjusted in one direction by movement of the adjustment means 53 and 54, respectively. If the number of elements then increases it is noted that this was the wrong direction and the adjustment means 53 and 54 respectively is moved in the other direction until an optimal signal has been achieved. This procedure is done for both the left and the right side of the scan line by utilizing the first and second adjustment means 53 and 54.

The above description is only one example of an embodiment of the invention as contained in the claims. It will be clear to the skilled person that a number of other embodiments are possible within the scope of the claims. In particular, the invention is not limited to a double arrangement but a single arrangement or an arrangement with three or more individual arrangements come within the scope of the claims. Further, the invention is not limited to a large format document scanner of the type shown in FIG. 1 but could equally well be utilized in a scanning system for small documents. The optical adjustment arrangement may be implemented in a separate scanning apparatus or form part of a scanning unit in a copying machine.

In this invention, a method for adjusting an optical arrangement for a scanning system is also provided. In this method, at least one optical part such as photodetecting array 23 and/or lens 24 is provided. The method comprises the steps of mounting this optical part on at least one of the first main part 21 or the second main part 22. Both main parts 21, 22 have center points 29 and 32 and base points 27, 28 and 30, 31, respectively, which define two triangles. The center points 29, 32 are fixed on the second main part 22 and frame 60, respectively, and on a line which is parallel with the optical axis 50 of the at least one optical part. One the base points of the set of points 27, 28 or 30, 31 is adjusted whereafter the other base point is adjusted in a manner as previously described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An optical adjustment arrangement for a scanning system, comprising:
    an adjustable optical part;
    a mounting onto which the optical part is mounted, the mounting including a main part having a center point and first and second base points defining a triangle;
    a frame onto which the mounting is fixed, the center point of the main part being fixed a predetermined distance relative to the frame; and
    adjustment means for separately adjusting the first and second base points of the main part in a direction transverse to a plane containing the triangle of the main part, wherein upon adjustment of one of the first and second base points, the main part rotates around a line defined by the center point and the other of the first and second base points.

2. The arrangement according to claim 1, wherein the adjustment means is a first adjustment means which adjusts the main part and wherein the main part is a first main part, the arrangement further comprises:
    a second main part, the optical part being mounted on at least one of the first and second main parts, the second main part having a center point and first and second base points defining a triangle, the center point of the second main part being fixed with respect to the frame, the center points of the first and second main parts being on a line which is parallel with an optical axis of the optical part; and
    second adjustment means for separately adjusting the first and second base points of the second main part in a direction transverse to a plane containing the triangle of the second main part, wherein upon adjustment of one of the first and second base points by the second adjustment means, the second main part rotates around a line defined by the center point and the other of the first and second base points of the second main part.

3. The arrangement according to claim 2, wherein the mounting further comprises at least one stabilizing part arranged around at least one of the first and second main parts.

4. The arrangement according to claim 3, wherein the at least one stabilizing part functions as a flexible hinge with respect to the adjustable base points of the at least one of the first and second main parts.

5. The arrangement according to claim 4, wherein the at least one stabilizing part has a center point and first and second base points defining a stabilizing triangle, the center point of each stabilizing part being connected to one of the base points of the at least one of the first and second main parts.

6. The arrangement according to claim 3, wherein the at least one stabilizing part has a center point and first and second base points defining a stabilizing triangle, the center point of each stabilizing part being connected to one of the base points of the at least one of the first and second main parts.

7. The arrangement according to claim 6, wherein the base points of the at least one stabilizing part are fixed with respect to the frame.

8. The arrangement according to claim 6, wherein the stabilizing triangle of the at least one stabilizing part is opposed to the triangle of the at least one of the first and second main parts.

9. The arrangement according to claim 8, wherein the base points of the at least one stabilizing part are fixed with respect to the frame.

10. The arrangement according to claim 3, further comprising two stabilizing parts, one stabilizing part being provided on each side of the at least one of the first and second main parts.

11. The arrangement according to claim 2, wherein the optical part to be adjusted is a light detecting device.

12. The arrangement according to claim 11, wherein the light detecting device is an array of light detecting elements.

13. The arrangement according to claim 12, wherein a first line of the triangle of the first main part connects one of the base points to the center point and a second line of the triangle connects the other of the base points to the center point, the array of light detecting elements being mounted on the first main part so that the first and second lines of the triangle coincide with a respective predetermined first and second detecting element of the array.

14. The arrangement according to claim 13, wherein,
the detecting array has a first element and a second element, each of the first and second elements having a plurality of adjacent elements, and
the first adjustment means adjusts the first base point of the first main part to move the detecting array until a desired value is read out from the first element and a predetermined number of adjacent elements, and whereafter the first adjustment means adjusts the second base point on the first main part to move the detecting array until a desired value is read out from the second detecting element and a predetermined number of adjacent elements, the first adjustment means independently adjusting the first and second base points.

15. The arrangement according to claim 2, wherein the optical part comprises an imaging device.

16. The arrangement according to claim 15, wherein the imaging device comprises a lens.

17. The arrangement according to claim 15, wherein the triangle of the second main part is so defined that sides of the triangle defining lines from the center points to the respective base point define outer limits of an object to be imaged by the imaging device.

18. The arrangement according to claim 17, wherein the optical part to be adjusted further comprises at least one light detecting device, the at least one light detecting device being positioned in alignment with the imaging device and upon adjustment of the imaging device, light intensity impinging upon the at least one light detecting device being read out.

19. The arrangement according to claim 18, wherein the second adjustment means adjusts the first base point of the second main part to move the imaging device until a desired value is read out from the detecting device and whereafter the second adjustment means adjusts the second base point on the second main part to move the imaging device until a desired value is read our from the detecting device, the second adjustment means independently adjusting the first and second base points.

20. The arrangement according to claim 2, wherein the arrangement is a multiple optical adjustment arrangement for a scanning system and wherein the first and second adjustment means are respective first and second optical adjustment arrangements.

21. The arrangement according to claim 20, wherein the first and second main parts are fixed together and wherein the optical part includes detecting elements on the first main part and an imaging device on the second main part.

22. The arrangement according to claim 21, wherein the optical part is a light detecting device which is an array of light detecting elements and wherein the first adjustment means adjusts focus of the detecting array and the second adjustment means adjusts position of an image imaged onto the detecting array by the imaging device.

23. The arrangement according to claim 1, wherein the arrangement is in a scanner.

24. A method of adjusting an optical arrangement for a scanning system, comprising the steps of:

providing at least one optical part;

mounting the at least one optical part on a main part, the main part having a center point and first and second base points defining a triangle;

fixing the center point of the main part a predetermined distance relative to a frame, the center point of the main part being on a line which is parallel with an optical axis of the at least one optical part;

initially adjusting a position of the first base point of the main part in a direction transverse to a plane containing the triangle of the main part; and subsequently adjusting a position of the second base point of the main part in a direction transverse to a plane containing the triangle of the main part, the initial and subsequently adjusting steps being independently carried out, the step of initially adjusting rotating the main part around a line defined by the center point and one of the first and second base points and the step of subsequently adjusting rotating the main part about a line defined by the center point and the other of the first and second base points.

25. The method according to claim 24, wherein the main part is a first main part and wherein the method further comprises the steps of:

providing a second main part, the second main part having a center point and first and second base points defining a triangle;

adjusting a position of the first base point of the second main part in a direction transverse to a plane containing the triangle of the second main part; and thereafter adjusting a position of the second base point of the second main part in a direction transverse to a plane containing the triangle of the second main part, the adjusting steps for the second main part being independently carried out.

26. The method according to claim 24, wherein the optical part is an array of light detecting elements, and wherein the triangle on the main part has a first and second line, the first line connects one of the base points to the center point and the second line connects the other of the base points to the center point, the array of light detecting elements being mounted on selected main part so that the first and second lines of the triangle coincide with a respective predetermined first and second detecting element of the array, the method further comprises the steps of reading out the first element after the step of initially adjusting and reading out the second element after the step of subsequently adjusting.

27. The method according to claim 26, further comprising the step of reading out a predetermined number of detecting elements adjacent the first and second elements upon at least one of initially adjusting and subsequently adjusting.

28. The method according to claim 27, wherein,
the step of initially adjusting moves the array by adjusting the first base point until a desired value is read out from the first element and the predetermined number of adjacent elements, and
the step of subsequently adjusting moves the array by moving the second base point until a desired value is read out from the second detecting element and the predetermined number of adjacent elements.

* * * * *